US012701347B2

(12) United States Patent
Sourav et al.

(10) Patent No.: US 12,701,347 B2
(45) Date of Patent: Aug. 4, 2026

(54) SYSTEM FOR SUPPORTING LOW-LATENCY EXTENDED REALITY SERVICES OVER ETHERNET PASSIVE OPTICAL NETWORK AND A METHOD THEREOF

(71) Applicant: INDIAN INSTITUTE OF TECHNOLOGY KHARAGPUR, Kharagpur (IN)

(72) Inventors: Dutta Sourav, Kharagpur (IN); Roy Dibbendu, Kharagpur (IN); Das Goutam, Kharagpu (IN)

(73) Assignee: INDIAN INSTITUTE OF TECHNOLOGY KHARAGPUR, Kharagpur (IN)

( * ) Notice: Subject to any disclaimer, the term of this patent is extended or adjusted under 35 U.S.C. 154(b) by 216 days.

(21) Appl. No.: 18/437,660

(22) Filed: Feb. 9, 2024

(65) Prior Publication Data
US 2024/0276130 A1     Aug. 15, 2024

(30) Foreign Application Priority Data

Feb. 11, 2023    (IN) .............................. 202331009017

(51) Int. Cl.
*H04Q 11/00*          (2006.01)
*H04L 67/131*        (2022.01)
(52) U.S. Cl.
CPC ....... *H04Q 11/0067* (2013.01); *H04L 67/131* (2022.05)
(58) Field of Classification Search
CPC . H04L 67/131; H04L 1/02; H04L 1/08; H04L 1/12; H04L 5/02; H04L 7/02; H04L 7/04;

H04L 9/14; H04L 9/18; H04L 9/28; H04L 12/02; H04L 12/28; H04L 12/50; H04L 13/02; H04L 15/04; H04L 15/24; H04L 17/02; H04L 17/16; H04L 25/02; H04L 25/30; H04L 25/38; H04L 27/02; H04L 27/10; H04L 27/18; H04L 27/26; H04L 27/32; H04L 41/02; H04L 41/04;
(Continued)

(56) References Cited

U.S. PATENT DOCUMENTS 10,903,906 B2 *   1/2021  Ashrafi ............... H01Q 21/065
11,152,991 B2 *  10/2021  Ashrafi ............... H01Q 21/065
(Continued)

OTHER PUBLICATIONS

Takahiro Suzuki et al., "A Demonstration of Adaptive Image Transmission That Meets Various Application Requirements in 10G-EPON," Oct. 22, 2020,IEEEAccess, vol. 8,2020, 186433-186438.*
(Continued)

*Primary Examiner* — Omar S Ismail
(74) *Attorney, Agent, or Firm* — PEARL COHEN ZEDEK LATZER BARATZ LLP

(57) ABSTRACT

The present invention discloses a network system for supporting XR devices/users over an EPON comprising one or more user XR devices, an edge server and a EPON based connection between said XR devices and said edge server to offer XR services with strict latency bounds over said EPON based connection involving offloading of XR device generated data to the edge server for processing, whereby the edge server process the XR data based on predicted future XR frames of said data after reconstructing EPON dependent inter-arrival pattern of the XR frames.

8 Claims, 3 Drawing Sheets

(58) Field of Classification Search

CPC ......... H04L 41/06; H04L 41/08; H04L 41/12; H04L 41/34; H04L 43/02; H04L 43/04; H04L 43/06; H04L 43/08; H04L 43/10; H04L 43/50; H04L 47/70; H04L 47/50; H04L 47/10; H04L 45/80; H04L 45/74; H04L 45/645; H04L 45/58; H04L 45/48; H04L 45/24; H04L 45/12; H04L 45/02; H04L 49/10; H04L 49/15; H04L 49/25; H04L 49/35; H04L 49/55; H04L 49/90; H04L 51/04; H04L 51/06; H04L 51/07; H04L 51/21; H04L 61/09; H04L 61/30; H04L 61/45; H04L 61/50; H04L 61/58; H04L 65/60; H04L 65/40; H04L 65/1066; H04L 65/10; H04L 67/01; H04L 67/14; H04L 67/2866; H04L 67/50; H04L 69/08; H04L 69/16; H04L 69/30; H04L 101/60; H04L 101/03; H04Q 11/04; H04Q 9/14; H04Q 9/08; H04Q 5/18; H04Q 5/02; H04Q 3/72; H04Q 3/64; H04Q 3/58; H04Q 3/42; H04Q 3/32; H04Q 3/18; H04Q 3/04; H04Q 1/18; H04Q 1/02

See application file for complete search history.

(56) References Cited

U.S. PATENT DOCUMENTS

| | | | | |
|---|---|---|---|---|
| 2010/0093552 A1* | 4/2010 | Panja | ................... | C12Q 1/6886 |
| | | | | 506/7 |
| 2018/0031576 A1* | 2/2018 | Margolis | ............ | G01N 33/5058 |
| 2018/0175996 A1* | 6/2018 | Jia | ........................... | H04H 20/69 |
| 2018/0351652 A1* | 12/2018 | Ashrafi | ............ | H04B 10/25753 |
| 2018/0376338 A1* | 12/2018 | Ashrafi | ............... | H04L 41/0895 |
| 2019/0149245 A1* | 5/2019 | Campos | ............. | H04B 10/2575 |
| | | | | 398/212 |
| 2019/0356603 A1* | 11/2019 | Hamzeh | .............. | H04L 12/2869 |
| 2020/0071367 A1* | 3/2020 | Margolis | ................ | A61K 31/24 |
| 2020/0186163 A1* | 6/2020 | Hamzeh | .................. | H03M 3/43 |
| 2021/0234592 A1* | 7/2021 | Ashrafi | ................ | H01Q 21/065 |
| 2022/0123849 A1* | 4/2022 | McCall | ................. | H04J 3/0658 |
| 2022/0247651 A1* | 8/2022 | Kerpez | ................... | H04L 43/12 |
| 2022/0321566 A1* | 10/2022 | Coyle | ................... | H04L 63/101 |
| 2022/0345417 A1* | 10/2022 | Kasichainula | .......... | H04L 47/30 |
| 2023/0096468 A1* | 3/2023 | Ong | .................... | H04L 47/2441 |

OTHER PUBLICATIONS

Erkai Chen et al., "Frame-Level Integrated Transmission for Extended Reality over 5G and Beyond, "Feb. 2, 2022, 2021 IEEE Global Communications Conference (GLOBECOM), pp. 1-4.*

Partha Bhaumik et al., "On downstream transmissions in EPON Protocol over Coax (EPoC): An analysis of Coax framing approaches and other relevant considerations," Aug. 19, 2014, Photon Network Commun (2014) 28, pp. 178-184.*

Jay Kumar Sundararajan et al.,"Performance Evaluation of Extended Reality Applications in 5G NR System," Oct. 21, 2021, 2021 IEEE 32nd Annual International Symposium on Personal, Indoor and Mobile Radio Communications (PIMRC), pp. 1-6.*

* cited by examiner

SYSTEM FOR SUPPORTING LOW-LATENCY EXTENDED REALITY SERVICES OVER ETHERNET PASSIVE OPTICAL NETWORK AND A METHOD THEREOF

CROSS REFERENCE TO RELATED APPLICATION

This application claims priority from Indian Patent Application No. 202331009017, filed Feb. 11, 2023, which is incorporated herein by reference in its entirety.

FIELD OF THE INVENTION

The present invention relates to supporting Extended Reality (XR) services over Ethernet Passive Optical Network (EPON). More specifically, the present invention is directed to provide a system and method for supporting XR services with strict latency constraints over EPON.

BACKGROUND OF THE INVENTION

Extended Reality (XR) has already been recognized by 3rd Generation Partnership Project (3GPP) group as one of the most important use cases for 5G and beyond. The 3GPP group has standardized an architecture known as 'split rendering architecture'. The 'split rendering architecture' implies splitting the workload between the XR device and an edge server. The XR device requires significant processing, which is not performed at the device, rather it is offloaded to an edge server to reduce cost and energy-consumption. Hence, an XR device generates the XR data and offloads it to an edge server through an access network that connects XR device and the server. The edge server then receives the UL data from an XR user, processes it, and then sends the processed data to one or more XR users, as shown in FIG. 1. Being one of the widely accepted transport networks for 5G backhaul, the Ethernet passive optical Network (EPON) should support the above XR services.

Sundararajan J K, Kwon H J, Awoniyi-Oteri O, Kim Y, Li C P, Damnjanovic J, Zhou S, Ma R, Tokgoz Y, Hande P, Luo T. in "Performance Evaluation of Extended Reality Applications in 5G NR System," 2021 IEEE 32$^{nd}$ Annual International Symposium on Personal, Indoor and Mobile Radio Communication (PIMRC), 2021, pp. 1-7 employs all existing technologies and shows the performance. They do not propose any new scheduling specific to XR E. Chen, S. Dou, S. Wang, Y. Cao and S. Liao in "Frame-Level Integrated Transmission for Extended Reality over 5G and Beyond," 2021 IEEE Global Communications Conference (GLOBECOM), 2021, pp. 1-6, doi: 10.1109/GLOBECOM46510.2021.9685604 performs resource block allocation for XR in wireless.

U.S. Pat. No. 10,852,838 discloses methods and systems for creating virtual and augmented reality.

U.S. Pat. No. 11,200,729 provides methods, devices, and apparatus to facilitate positioning of an item of virtual content.

Supporting XR in EPON is promising since XR services require a high data rate, low latency, and high transmission reliability. The emergence of time-critical applications makes the latency requirements even stricter. For example, cloud gaming requires end-to-end latency of 5 ms (uplink: 2.5 ms and downlink: 2.5 ms). Thus, supporting XR services with stringent latency requirement over EPON requires completing the XR data scheduling within this extremely strict delay constraint. Both the processing time and the scheduling delay must be extremely short to meet such stringent latency requirements, necessitating a large network bandwidth and a fast edge server CPU. Due to the high cost of supporting XR services with stringent latency requirements, the edge server must be installed after the backhaul so that more users can share this cost. To the best of inventor's knowledge, there is no protocol that supports XR service over EPON via optical backhaul.

OBJECT OF THE INVENTION

It is thus the basic object of the present invention is to develop a method and system for supporting XR services over EPON.

Another object of the present invention is to develop an EPON based network with XR users which can support Low-latency XR devices/users in EPON.

Yet another object of the present invention is to develop method and system for supporting XR services with stringent latency requirement over EPON through systematic utilization of resources and sharing cost over users.

A still further object of the present invention is to develop method and system for supporting XR services over EPON via optical backhaul.

Another object of the present invention is to develop method and system for supporting XR services over EPON through an application layer-aware MAC scheduling mechanism and an AI-based predictor for predicting application layer data which is used for MAC scheduling.

SUMMARY OF THE INVENTION

Thus, according to the basic aspect of the present invention there is provided a network system for supporting XR devices/users over an EPON comprising one or more user XR devices;

an edge server;

EPON based connection between said XR devices and said edge server to offer XR services with strict latency bounds over said EPON based connection involving offloading of XR device generated data to the edge server for processing, whereby the edge server process the XR data based on predicted future XR frames of said data after reconstructing EPON dependent inter-arrival pattern of the XR frames.

In a preferred embodiment of the present network system, to determine the play-off delay, the edge server should know the queuing delay of each XR frame. In other words, the edge server must be aware of the generation time of each XR frame at the XR user to make the reconstruction of the inter-arrival pattern feasible. Fortunately, for the case of XR traffic, the edge server is aware of the generation times of all frames, as the packet generation time is periodic in nature.

In a preferred embodiment of the present network system, the edge server includes a play-off buffer which stores uplink XR data to add an extra play-off delay to each XR frame (denoted by $$D_b^{k,x}$$

for x$^{th}$ frame of kth XR user), making the total queuing (denoted by $$D_q^{k,x})$$

and play-off delay a constant $$\left(\text{say } D_{po}^k = D_q^k + D_b^k \text{ for } k^{th} \text{ XR user}\right);$$

wherein total uplink delay faced by all the XR frames of the kth user XR device $$\left(D_{tot}^k\right)$$

is given by $$D_{tot}^k = D_{prop}^k + D_{tx}^k + D_{po}^k \leq D_{ub}^k + D_p^k$$

where, $$D_{prop}^k, D_{tx}^k, D_{ub}^k, \text{ and } D_p^k$$

denote propagation time, transmission time, uplink delay bound, and prediction duration respectively, here improved inter-arrival pattern reconstruction is achievable with greater $$D_{po}^k,$$

which lowers prediction error and to increase $$D_{po}^k, D_p^k$$

is needed to be increased as well, resulting in an increment of prediction error;

wherein, the edge server involves the play-off buffer to set best $$D_p^k$$

to reduce the prediction error.

In a preferred embodiment of the present network system, the edge server includes
  a data receiver for receiving the XR data;
  said play-off buffer to store the XR data for reconstruction of the inter-arrival pattern of the XR frames as generated by the XR device user;
  a reconstruction controller for controlling operation of the play-off buffer to play the stored frames at a selected speed ensuring all the frames are subject to a constant delay;
  an AI based frame predictor to predict future frames based on the reconstructed data;
  a processor for processing thus predicted future frames; and
  a transmitter for transmitting the processed XR frames to the one or more XR device users.

In a preferred embodiment of the present network system, the EPON based connection includes ONU and OLT based connection.

In a preferred embodiment, the present network system includes SDN controller operating in combination with the edge server, the OLT and the ONU for facilitating the edge server to reselect the prediction time for all XR device users every time when an XR device users registers or deregisters which changes the network load and also changing error in the reconstruction pattern.

In a preferred embodiment of the present network system, the edge server further includes prediction duration calculator for selecting prediction duration for the all XR devices and informing the same to the SDN controller and the AI-based frame predictor.

In a preferred embodiment of the present network system, the SDN controller includes class mapper which decides class corresponding to delay bound of $$D_{ub}^k + D_p^k,$$

and informs the class information to the OLT and ONUs enabling the OLT schedules the XR device users.

In a preferred embodiment of the present network system, the playoff-buffers are implemented using edge server memory and the reconstruction controller, AI-based frame predictor and the Prediction duration calculator are implemented involving processing, memory, and storage of the edge server.

According to another aspect in the present invention there is provided a method for XR devices/users over an EPON involving the system as claimed comprising
  sending registration request to the edge server by an XR device user including informing its requirement to the SDN controller;
  allocating a default class (correspond to $$\left(\text{correspond to } D_p^k = 0\right)$$

according to the requirement by the class mapper of SDN controller 600 and informing the same to the OLTs and ONUs;
  initiating uplink transmission of the XR data by the XR device though the OLTs and ONUs which are received by the receiver of the edge server;
  storing the XR data in the play-off buffer of the edge server to reconstruct the inter-arrival pattern of the XR frames of data as generated by the XR user;
  controlling the play-off buffer by the reconstruction controller to play the XR frames ensuring all frames are subject to a constant delay;
  predicting future frames based on the reconstructed data using the AI-based frame predictor;
  processing the predicted frames at the processor and after processing, sending the processed data to the XR device users by the transmitter;
  involving the prediction duration calculator for selecting prediction durations and informing the same to the SDN controller and the AI-based frame predictor; and
  involving the class mapper in the SDN controller to decide class corresponding to delay bound of $$D_{ub}^k + D_p^k,$$

and informs the class information to the OLT and the ONUs for scheduling the XR device users.

BRIEF DESCRIPTION OF THE ACCOMPANYING DRAWINGS

Figure 3:
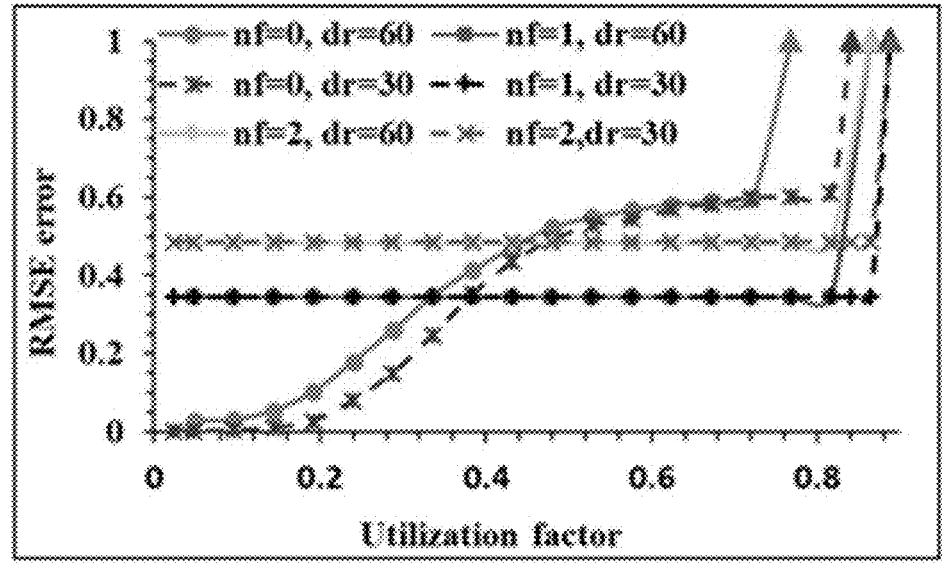

FIG. 3 presents Root Means Square Error (RMSE) as a function of utilization factor for different data rates (30 and 60 Mbps).

DETAILED DESCRIPTION OF THE INVENTION

Figure 1:
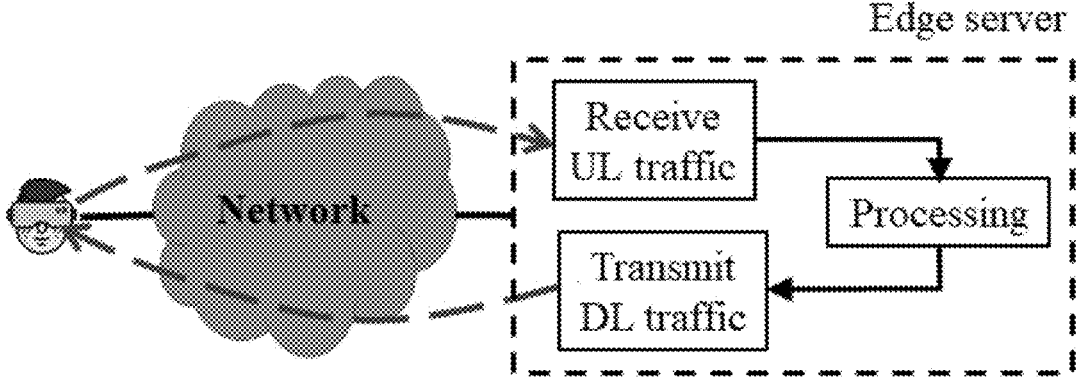
FIG. 1 shows a traditional Split-Rendering Network Architecture.
Figure 2:
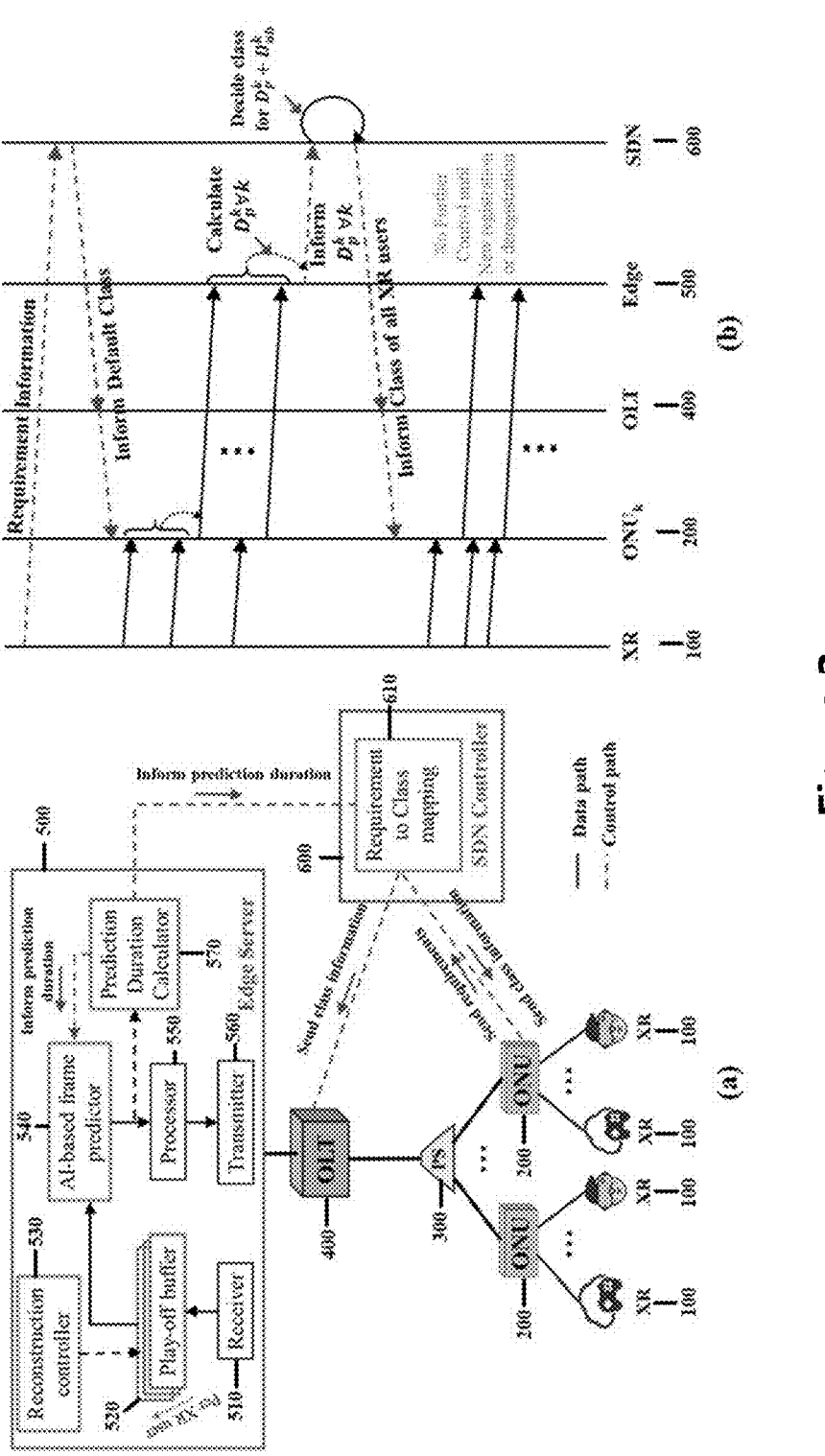
FIG. 2 shows (a) proposed architecture for enabling application-aware MAC in EPON and (b) timing diagram for illustrating the proposed MAC scheduling.

The present invention discloses a system and method for supporting Low-latency XR in EPON. For this, modifications in the existing architecture are proposed. FIG. 2a, shows the components in an EPON based network with XR devices/users 100, where the data is processed at the edge server 500. The boxes marked in green 520, 530, 540, 570 represent the additional modules to implement in the present system and method. The SDN controller 600 has an additional module which performs a requirement to class mapping 610. The proposed method is shown in FIG. 2b. It shows the timeline diagram of the various messages exchanges between the modules of FIG. 2a. The detailed description is provided below.

FIG. 2a shows the proposed EPON architecture for facilitating application-aware Media Access Control (MAC) to offer XR services with strict latency bounds. The proposed network system is a modified form of the "split rendering architecture," where processing at the edge server 500 takes place on predicted future XR frames rather than actual XR frames. Note that XR frames pass through the EPON network (which involves OLT and ONUs) to reach the edge server 500 where prediction of future XR frames is performed. The amount of queuing delay added by the EPON network varies for various packets. Thus, the inter-arrival pattern of the XR frames at the edge server 500, may not necessarily be the same as generated by the XR frames. Thus, the data that is used for predicting future frames become erroneous, leading to a very high prediction error. Therefore, the edge server 500 needs to reconstruct the inter-arrival pattern of XR frames before predicting future XR frames. To do so, the received uplink data is stored in a play-off buffer to add an extra play-off delay to each XR frame (denoted by $$D_b^{k,x}$$

for $x^{th}$ frame of kth XR user), making the total queuing (denoted by $$D_q^{k,x}$$

and play-off delay a constant, say $$D_{po}^k = D_q^k + D_b^k$$

for $k^{th}$ XR user.

It is obvious that to determine the play-off delay, the edge server 500 should know the queuing delay of each XR frame. In other words, the edge server 500 must be aware of the generation time of each XR frame at the XR user to make the reconstruction of the inter-arrival pattern feasible. Fortunately, for the case of XR traffic, the edge server is aware of the generation times of all frames, as the packet generation time is periodic in nature. In proposed method, the total uplink delay faced by all XR frames of the kth user $$(D_{tot}^k)$$

is given by:

$$D_{tot}^k = D_{prop}^k + D_{tx}^k + D_{po}^k \le D_{ub}^k + D_p^k$$

Here, $$D_{prop}^k, D_{tx}^k, \text{ and } D_{ub}^k$$

denote propagation time, transmission time, and uplink delay bound respectively. Note that, improved inter-arrival pattern reconstruction is achievable with greater $$D_{po}^k,$$

which lowers prediction error. However, to increase $$D_{po}^k, D_p^k$$

is needed to be increased as well, resulting in an increment of prediction error. Thus, the edge server 500 should choose the best $$D_p^k$$

to reduce prediction error. The present simulation findings point to a straight forward way of determining the prediction length at the edge server, which will be discussed in more detail in the following section. Note that the network load changes every time an XR user registers or deregisters, changing the error in the reconstruction pattern. As a result, whenever an XR user registers or deregisters, the edge server is required to reselect the prediction time for all XR users. The OLT and ONUs must be notified of the chosen prediction duration. The proposed design uses an SDN controller to do this (refer FIG. 2a). Furthermore, the requirements of various XR users differ. Eight distinct classes may be scheduled using the EPON GATE message. Therefore, all XR user requirements should be divided into eight distinct classes. The SDN controller does this mapping from the requirement to the class in the proposed architecture, as shown in FIG. 2a.

The functionality of the proposed network system can be summarized as follows, as shown in FIG. 2b:

When an XR user 100 requests for registration, the XR user also inform its requirement to the SDN controller 600

The requirement to class mapper 610 of SDN controller 600 allocates a default class (correspond to $$D_p^k = 0),$$

and informs it to the OLT 400 and ONUs 200

The XR user 100 then initiates uplink transmission, and the XR user's data is received at 510. Then, the data is stored in a play-off buffer 520 at the edge server to reconstruct the inter-arrival pattern of the XR frames as generated by the XR user. The play-off buffer is controlled by the reconstruction controller 530. The controller 530 instructs the play-off buffer 520 to play the stored frames so that all frames are subject to a constant delay The reconstructed data is used to predict future frames using an AI-based frame predictor 540, which is then processed at the processor 550. After processing, the processed data is send to the XR users by transmitter 560.

The edge server 500 also selects prediction durations using the prediction duration calculator 570 of all XR users, and informs it to the SDN controller 600 and the AI-based frame predictor 540

The requirement to class mapper 610 in SDN controller 600 decides class corresponding to delay bound of $$D_{ub}^k + D_v^k,$$

and informs the class information to the OLT 400 and ONUs 200. Based on this information, the OLT 400 schedules the XR users 100.

All the described elements are implemented by the edge server using its memory, processing, and storage units. The additional blocks are new functional blocks that the edge server needs to implement. The playoff-buffers are implemented using edge server memory. The reconstruction controller 530, AI-based frame predictor 540 and Prediction duration calculator 570 require processing, memory, and storage of the edge server. SDN controllers are already available and we introduce a requirement to class mapper application functionality in the SDN controller which is implemented using the SDN controller memory and processing.

Performance Evaluation

Comparative Study

First it is investigated whether EPON's standard MAC scheduling can handle XR applications with strict latency requirements. Since XR traffic has a very stringent latency requirement, it can be considered as Expedited Forwarding (EF) class. Table 1 provides the maximum number of XR users (per ONU) that a 10G-EPON network can handle along with the corresponding utilization factor while fulfilling XR latency and transmission reliability requirements for different values of the number of ONUs ($N_0$), data rate ($d_r$), and frame rate ($r_f$). The latency requirement is considered to be 2.5 ms (which is the uplink delay bound for cloud gaming), while transmission reliability is assumed to be 99%. Table 1 clearly shows that the traditional EPON scheduling for XR traffic with strict latency requirements results in very poor network utilization.

TABLE 1

| | Illustration of the ineffectiveness of EPON's standard MAC scheduling for low latency XR | | | | | | | |
|---|---|---|---|---|---|---|---|---|
| | Maximum supportable XR users per ONU | | | | Maximum utilization factor | | | |
| Delay bound | $N_o = 8$, $d_r = 30$, $r_f = 60$ | $N_o = 8$, $d_r = 60$, $r_f = 60$ | $N_o = 8$, $d_r = 30$, $r_f = 120$ | $N_o = 12$, $d_r = 60$, $r_f = 60$ | $N_o = 8$, $d_r = 30$, $r_f = 60$ | $N_o = 8$, $d_r = 60$, $r_f = 60$ | $N_o = 8$, $d_r = 30$, $r_f = 120$ | $N_o = 12$, $d_r = 60$, $r_f = 60$ |
| 2.5 ms | 7 | 2 | 7 | 1 | 0.168 | 0.096 | 0.336 | 0.072 |
| 10 ms | 36 | 17 | 19 | 11 | 0.864 | 0.816 | 0.912 | 0.792 |

RMSE

FIG. 3 presents the Root Means Square Error (RMSE) as a function of utilization factor for different data rates (30 and 60 Mbps). The utilization factor is altered by changing the number of XR users per ONU. The prediction duration is specified by the number of predicted future XR frames (denoted by n f). The delay bound and the polling cycle time (for $n_f=0$) are considered to be 2.5 and 4 ms, respectively. Frame rate and the number of ONUs are assumed to be 60 fps and 8, respectively. The considered XR traffic model is shown in FIG. 2a. It can be seen from FIG. 3 that the RMSE error rises as traffic demand increases. This is because XR frames experience increased delay as load increases, increasing the risk of a delay bound violation. However, if $n_f>1$, the delay bound becomes $$D_{ub}^k + \frac{n_f}{r_f},$$

implying that the delay constraint is only violated once the buffer starts to fill. Thus, for $n_f \geq 1$, despite changes in the utilisation fraction, the RMSE error remains constant until buffer build-up occurs. This constant is the RMSE error for predicting n f future frames.

Prediction of more future frames leads to higher prediction error. Thus, the RMSE for $n_f=2$ is always higher than that of for $n_f=1$ as shown in FIG. 3. However, a cross-over point exists between the RMSE for $n_f=0$ and $n_f=1$. This observation suggests a very simplified method for selecting the prediction duration.

Selection of Prediction Duration

As shown in FIG. 3, selection of $n_f \geq 2$ is not at all beneficial. Thus, the edge server chooses ns between 0 and 1. Up to the cross-over point, choosing $n_f=0$ is favourable; but, beyond that point, choosing $n_f=1$ is advantageous. When an XR user tries to register, the edge server computes the RMSE for $n_f=1$ and stores this value. The XR user is allowed to register if the buffer build-up doesn't begin, and the default class is allotted. All other registered ONUs (with $n_f=0$) compare their current RMSE to the previously saved RMSE for $n_f=1$. If the current RMSE becomes higher, then select $n_f$ as 1, which is then informed to both the OLT and ONUs via SDN.

The invention claimed is:

1. A network system for supporting XR devices/users over an EPON comprising one or more user XR devices;

an edge server;

EPON based connection between said XR devices and said edge server to offer XR services with strict latency bounds over said EPON based connection involving offloading of XR device generated data to the edge server for processing, whereby the edge server processes the XR data based on predicted future XR frames of said data after reconstructing inter-arrival pattern of the XR frames;

wherein the edge server is updated with queuing delay of each XR frame due to the EPON by involving periodic generation time of each XR frame at the XR device to make the reconstruction of the inter-arrival pattern feasible;

wherein the edge server includes a play-off buffer which stores uplink XR data to add an extra play-off delay to each XR frame (denoted by $$D_b^{k,x}$$

for $x^{th}$ frame of kth XK user), making the total queuing (denoted by $$D_q^{k,x})$$

and play-off delay a constant $$(\text{say } D_{po}^k = D_q^k + D_b^k \text{ for } k^{th} XR \text{ user});$$

wherein total uplink delay faced by all the XR frames of the $k^{th}$ user XR device $$(D_{tot}^k)$$

is given by:

$$D_{tot}^k = D_{prop}^k + D_{tx}^k + D_{po}^k \le D_{ub}^k + D_p^k$$

where $$D_{prop}^k, D_{tx}^k, \text{ and } D_{ub}^k$$

denote propagation time, transmission time, and uplink delay bound respectively, here improved inter-arrival pattern reconstruction is achievable with greater $$D_{po}^k,$$

which lowers prediction error and to increase $$D_{po}^k, D_p^k$$

is needed to be increased as well, resulting in an increment of prediction error; and wherein the edge server involves the play-off buffer to set best $$D_p^k$$

to reduce the prediction error.

2. The network system as claimed in claim 1, wherein the edge server includes a data receiver for receiving the XR data;

said play-off buffer to store the XR data for reconstruction of the inter-arrival pattern of the XR frames as generated by the XR device user;

a reconstruction controller for controlling operation of the play-off buffer to play the stored frames at a selected speed ensuring all the frames are subject to a constant delay;

an AI based frame predictor to predict future frames based on the reconstructed data;

a processor for processing thus predicted future frames; and a transmitter for transmitting the processed XR frames to the one or more XR device users.

3. The network system as claimed in claim 1, wherein the EPON based connection includes OLU and OLT based connection.

4. The network system as claimed in claim 3, includes SDN controller operating in combination with the edge server, the OLT and the ONU for facilitating the edge server to reselect the prediction time for all XR device users every time when an XR device users registers or deregisters which changes the network load and also changing error in the reconstruction pattern.

5. The network system as claimed in claim 1, wherein the edge server further includes prediction duration calculator for selecting prediction duration for the all XR devices and informing the same to the SDN controller and the AI-based frame predictor.

6. The network system as claimed in claim 4, wherein the SDN controller includes class mapper which decides class corresponding to delay bound of $$D_{ub}^k + D_p^k,$$

and informs the class information to the OLT and ONUs enabling the OLT schedules the XR device users.

7. The network system as claimed in claim 1, wherein the playoff-buffers are implemented using edge server memory and the reconstruction controller, AI-based frame predictor and the Prediction duration calculator are implemented involving processing, memory, and storage of the edge server.

8. A method for XR devices/users over an EPON comprising sending registration request to an edge server by an XR device user including informing its requirement to a SDN controller;

allocating a default class (correspond to $$D_p^k = 0)$$

according to requirement by class mapper of the SDN controller and informing the same to OLTs and ONUs;

initiating uplink transmission of XR data by the XR device though the OLTs and ONUs which are received by receiver of the edge server;

storing the XR data in play-off buffer of the edge server to reconstruct inter-arrival pattern of XR frames of data as generated by user of the XR device;

controlling the play-off buffer by a reconstruction controller to play the XR frames ensuring all frames are subject to a constant delay;

predicting future frames based on the reconstructed data using an AI-based frame predictor;

processing the predicted frames at a processor and after processing, sending the processed data to the XR device users by a transmitter;

involving a prediction duration calculator for selecting prediction durations and informing the same to the SDN controller and the AI-based frame predictor; and involving a class mapper in the SDN controller to decide class corresponding to delay bound of $$D_{ub}^k + D_p^k,$$

and informs the class information to the OLT and the ONUs for scheduling the XR device users.

* * * * *